United States Patent Office 3,322,761
Patented May 30, 1967

3,322,761
PURIFICATION OF TRIALLYL ISOCYANURATE
Edwin D. Little, Hopewell, Va., assignor to Allied Chemical Corporation, New York, N.Y., a corporation of New York
No Drawing. Filed July 14, 1965, Ser. No. 472,004
9 Claims. (Cl. 260—248)

This invention relates to the preparation of triallyl isocyanurate and is particularly concerned with the provision of triallyl isocyanurate in a substantially pure state.

By reason of its unsaturated nature, triallyl isocyanurate can be readily polymerized to produce polymers useful for a wide variety of purposes. These polymers possess a high degree of clarity and thus find use, for example, in the formulation of various types of lacquers and other finishes. Since such polymers also adhere to glass with considerable tenacity, they can be employed in the production of laminated glass articles such as safety glass. In addition, these polymers are particularly resistant to chemical action and can be used in many situations in which chemical attack is an important factor to be taken into consideration. Other applications of these polymers include their utilization in potting and similar electrical insulating compositions.

Triallyl isocyanurate can be produced by reacting allyl chloride, cyanuric acid, and a caustic alkali such as sodium hydroxide in an aqueous medium. As disclosed in United States Patent 2,894,950, an improved yield can be obtained by adding the allyl chloride to an aqueous reaction mixture containing the cyanuric acid and the caustic alkali while controlling the alkalinity of the reaction medium. This reaction can also be conducted in the presence of a catalyst such as cuprous ion-providing catalyst decribed in United States Patent 3,065,231.

Regardless of which procedure is followed, however, the resulting triallyl isocyanurate contains impurities which both impart a color thereto and are otherwise undesirable. Upon polymerization of such triallyl isocyanurate, the color impurities are carried over into the resulting polymer and render the same unsuitable for those applications in which a clear or substantially clear polymeric material is required. Moreover, these impurities tend to interfere with the polymerization reaction itself so that it often becomes difficult to standardize such reaction.

For these reasons it is customary to treat such crude triallyl isocyanurate in order to eliminate or substantially reduce the amount of such impurities. One treatment that is utilized for this purpose is to distill the crude triallyl isocyanurate under a high vacuum, generally on the order of 10 mm. of Hg or less, with removal of triallyl isocyanurate substantially free of such impurities as the overhead. While triallyl isocyanurate in a substantially pure state can be so obtained, ordinarily over one-half of the crude triallyl isocyanurate is lost due apparently to extensive polymerization in the distillation pot.

It has been proposed to overcome this disadvantage by carrying out such distillation in the presence of a polymerization inhibitor such as hydroquinone, 2,6-di-(tert.-butyl)-4-methyl phenol, or 2,2'-methylene bis(4-methyl-6-tert.-butyl phenol). Improved yields of substantially pure triallyl isocyanurate can thereby be obtained; but such improvement is generally more than offset by the attendant difficulty of removing the polymerization inhibitor from the distilled triallyl isocyanurate. In addition, such inhibitors do not substantially completely prevent polymerization of the crude triallyl isocyanurate undergoing distillation.

I have now found, quite unexpectedly, that such purification of crude triallyl isocyanurate containing color and other impurities can be so carried out that not only are such impurities effectively separated from the triallyl isocyanurate but such separation is also accomplished without any material loss of triallyl isocyanurate due to polymerization.

This objective is achieved in accordance with the invention by initially treating the crude triallyl isocyanurate containing color and other impurities with hydrogen under conditions to effect absorption of hydrogen by such crude triallyl isocyanurate in an amount less than that required to produce any significant hydrogenation of the triallyl isocyanurate itself, and thereafter subjecting such treated crude triallyl isocyanurate to distillation in order to separate triallyl isocyanurate substantially free of such impurities as the overhead.

That such result is obtained is highly surprising inasmuch as it would be normally expected that the hydrogen absorbed by the crude triallyl isocyanurate would correspondingly saturate the triallyl isocyanurate itself. The fact is, however, that the present treatment can be effectively carried out without any significant hydrogenation of the triallyl isocyanurate itself occurring. It appears, therefore, that not only are these color and other impurities more or less unsaturated in nature but that they also exhibit a preference for hydrogen as compared to the triallyl isocyanurate itself.

Ideally, such treatment of the crude triallyl isocyanurate should be so conducted that only so much hydrogen is absorbed as to saturate or otherwise react with the impurities therein. It so happens, however, that this quantity is not directly ascertainable. On the one hand, as has already been indicated, it is not possible to separate such impurities from the crude triallyl isocyanurate in order to determine their amount; on the other hand, it is not known to what degree these impurities are unsaturated and/or to what extent they otherwise have an affinity for hydrogen.

In practice, therefore, it is necessary to determine experimentally approximately how much hydrogen must be absorbed by the crude triallyl isocyanurate to accomplish the present purpose. Such determination presents no particular difficulty, however; for several treatments of a crude triallyl isocyanurate to effect varying degrees of absorption of hydrogen thereby, followed by distillation of the treated crude triallyl isocyanurate each time, will ordinarily suffice to give a satisfactory indication of the extent to which the hydrogen treatment needs to be carried. Under no circumstances, as will be appreciated, should the quantity of hydrogen to be absorbed by the crude triallyl isocyanurate be so selected as to result in any significant or substantial hydrogenation of the triallyl isocyanurate itself.

Ordinarily, no more than about 0.1 mol of hydrogen per mol of triallyl isocyanurate needs to be absorbed by the crude triallyl isocyanurate. As has been found, an amount of hydrogen up to this approximate maximum is not only generally adequate to saturate or react with the impurities in the crude triallyl isocyanurate but is also not so great as to result in any appreciable hydrogenation of the triallyl isocyanurate itself. The particular amount of hydrogen that is used will, of course, be governed by the crude triallyl isocyanurate undergoing treatment.

The absorption of hydrogen by the crude triallyl isocyanurate can be effected under appropriate temperature and pressure conditions alone, but the requirements in this regard tend to be rather severe. Preferably, therefore, the treatment of the crude triallyl isocyanurate with hydrogen is carried out in the presence of a catalyst, for which use any conventional solid hydrogenation catalyst has been found entirely satisfactory. Particularly suitable examples of such a hydrogenation catalyst comprise palladium and platinum, which, as is the usual practice, are advantageously employed in combination with a support such as alumina or charcoal. Raney nickel constitutes another example of hydrogenation catalyst suitable for this purpose. As will be appreciated, the catalyst is desirably utilized in a form sufficiently finely divided as to provide the maximum contact surface consistent with other operating conditions.

Such catalytic treatment of the crude triallyl isocyanurate with hydrogen can be conducted in various ways. For example, particles of the catalyst can be arranged in a bed in an appropriate vessel, and the crude triallyl isocyanurate can be passed through such bed in conjunction with hydrogen. It has been found preferable, however, to disperse the catalyst particles in the crude triallyl isocyanurate to form a slurry, which can then be maintained in contact with hydrogen in a closed reaction zone until the requisite amount of hydrogen has been absorbed by the crude triallyl isocyanurate. Alternatively, such a slurry can be contained in a reaction zone through which a stream of hydrogen is passed in contact therewith until the crude triallyl isocyanurate has absorbed the necessary amount of hydrogen. In either case the catalyst particles can be maintained in suspension as necessary by suitable agitation of the slurry.

Upon completion of such hydrogen absorption, the catalyst particles are desirably separated from the treated crude triallyl isocyanurate as by filtration before the latter is subjected to further processing. Where filtration is utilized to effect such separation of the catalyst particles, a filter aid such as a diatomaceous earth is advantageously employed to facilitate the filtering operation particularly in view of the relatively small amount (usually substantially less than 1% by weight of the crude triallyl isocyanurate being treated) of hydrogenation catalyst that is required. A minor amount of the treated crude triallyl isocyanurate is retained by the filter aid but is readily recoverable, after filtration of one or more batches of treated crude triallyl isocyanurate as desired, by extraction with a suitable solvent such as ethanol, benzene or acetone. As will be appreciated, provision may also be made for recovery of the separated catalyst and reutilization of the same.

The temperature at which such catalytic absorption of hydrogen is effected can range from atmospheric temperature upward. It is not necessary, however, to operate at a relatively high temperature in order to obtain satisfactory results. Moreover, the use of temperature sufficiently high to cause the crude triallyl isocyanurate to undergo polymerization should obviously be avoided. A temperature of up to about 200° C., it has been found, is generally adequate to accomplish the desired result. Although some heat is generated by the absorption of the hydrogen, the amount of such heat is ordinarily not a factor that needs to cause any concern.

Similarly, the pressure at which the catalytic absorption of hydrogen is effected can range from atmospheric pressure upward. While a relatively high pressure can be employed with the obvious benefit of an increased rate of hydrogen absorption, it has been found that the hydrogen can be satisfactorily absorbed even at a relatively low pressure, the use of which, moreover, possesses the advantage that less costly equipment can then be utilized. Ordinarily, as has been found, a pressure of up to about 200 atmospheres is generally sufficient for the purpose.

If desired, the crude triallyl isocyanurate may be treated with hydrogen in the presence of a solvent therefor. The use of such a solvent serves to decrease the viscosity of the crude triallyl isocyanurate so that it can be handled more readily. This feature is particularly advantageous where the catalyst particles are to be separated from the treated crude triallyl isocyanurate by filtration. A solvent appropriate for this purpose comprises, inter alia, an alcohol such as ethanol, an aliphatic hydrocarbon such as heptane, an aromatic hydrocarbon such as benzene, or a ketone such as acetone.

The crude triallyl isocyanurate may, if desired, be subjected, prior to the above-described absorption of hydrogen thereby, to a preliminary treatment for removal of a portion of the color and other impurities. For this purpose the crude triallyl isocyanurate may be treated, for example, with a decolorizing carbonaceous material such as bone black or activated charcoal. Such a preliminary treatment is particularly useful where the crude triallyl isocyanurate is unusually dark or highly discolored.

Following completion of the absorption of hydrogen, the resulting treated crude triallyl isocyanurate is distilled for separation of triallyl isocyanurate substantially free of impurities as the overhead. With the exercise of suitable precautions to prevent any appreciable polymerization of the triallyl isocyanurate from occurring under the influence of heat, such distillation can be conducted at atmospheric pressure. Because of the undue difficulties involved in doing so, however, resort is preferably had to the use of a vacuum sufficiently high to enable the triallyl isocyanurate to be readily distilled. For this purpose a vacuum on the order of 10 mm. of Hg or less is desirably employed. The condensate thereby obtained is clear and otherwise essentially free of impurities present in the initial crude triallyl isocyanurate.

A particular advantage of the present procedure is that such condensate represents substantially all of the triallyl isocyanurate contained in the crude triallyl isocyanurate subjected to the described treatment with hydrogen. In other words, the absorption of hydrogen by the crude triallyl isocyanurate in the indicated manner enables the resulting treated crude triallyl isocyanurate to be thereafter distilled with no or substantially no loss of triallyl isocyanurate due to polymerization during distillation. A high yield of triallyl isocyanurate obtained by the reaction of allyl chloride, cyanuric acid and a caustic alkali can thereby be effectively maintained with the simultaneous elimination of the impurities contained in the resulting crude triallyl isocyanurate or the reduction of the same to an amount that can be tolerated.

Although the mechanism of the present hydrogen treatment is not known for certain, it appears, as suggested above, that the hydrogen absorbed by the crude triallyl isocyanurate selectively reacts with the impurities present in such crude triallyl isocyanurate and thereby modifies them in such a way that they do not interfere with the subsequent distillation of the treated crude triallyl isocyanurate. Apparently these impurities are of such a nature that, unless they are inactivated by such hydrogen treatment, they tend to act as a catalyst for the polymerization of the triallyl isocyanurate contained in the crude triallyl isocyanurate during the distillation thereof.

The hydrogen treatment of a crude triallyl isocyanurate provided by the present invention does not affect the polymerizability of the resulting triallyl isocyanurate condensate, which can be polymerized without difficulty in accordance with usual practice. In addition, such triallyl isocyanurate condensate is sufficiently stable in storage that after a period of more than one year it still retains its original clarity and does not show any change in its viscosity.

The invention will be illustrated by the following examples:

Example A

A reaction vessel provided with a stirrer, a reflux condenser and a thermometer was charged with 925 parts of an alkaline aqueous cyanurate solution (60 parts of sodium hydroxide, 800 parts of water and 65 parts of cyanuric acid) and externally heated to 50° C. There was then added 0.495 part of solid, cuprous chloride, followed by the addition of 235 parts of allyl chloride over 7 to 8 minutes. The heat evolved by the resulting exothermic reaction was dissipated by refluxing the allyl chloride at atmospheric pressure, the reflux condenser being maintained at about 5° C. The basicity of the reaction mixture decreased to a pH of 7 during the first twelve minutes of the reaction period and was then maintained at 9 to 10.5 during the remainder of the reaction period by the addition of 50 parts by volume of a 50% aqueous sodium hydroxide solution. At the end of the thirty-minute reaction period, the reaction mixture was cooled and allowed to stand and separated into an aqueous layer and an oily layer comprising crude triallyl isocyanurate. The aqueous layer was then washed with benzene to extract the retained oil. The benzene extract was added to the oily layer, the resulting benzene solution was sludge-filtered, and the benzene was removed from such solution by evaporation at a subatmospheric pressure of 400 to 500 mm. of Hg. The crude triallyl isocyanurate so obtained amounted to 107.6 parts, corresponding to a yield of 86.6% based on the cyanuric acid charged.

Comparative example

About 65 parts of a crude triallyl isocyanurate prepared as in Example A were placed in an all-glass vacuum distillation apparatus having a short column (equivalent to about 2 theoretical plates) and distilled under a high vacuum (0.1 mm. of Hg). About 27 parts of substantially pure triallyl isocyanurate were collected overhead while 38 parts (58% of the charge) polymerized and remained in the distillation pot.

Example 1

About 100 parts of a crude triallyl isocyanurate prepared as in Example A were placed in a low-pressure hydrogenation apparatus along with 100 ml. of ethanol and 0.59 g. of a catalyst comprising 5% of Pd on charcoal. Hydrogen was introduced into the system under a pressure of 45 pounds per square inch gauge and allowed to absorb at ambient temperature until 0.09 mol was taken up by the crude triallyl isocyanurate as indicated by the pressure drop. The reaction mixture was then filtered through a bed of a diatomaceous earth (Celite) to remove the catalyst. About 86.5 parts of the treated crude triallyl isocyanurate were collected as the filtrate; about 13.5 parts remained in the diatomaceous earth bed but were recoverable by solvent extraction. The ethanol was recovered from such filtrate by atmospheric distillation. The remaining treated crude triallyl isocyanurate was placed in the distillation apparatus described in the Comparative Example and was distilled at a pressure of 0.1 mm. of Hg to give about 80 grams of substantially pure triallyl isocyanurate. There remained in the distillation pot only about 6.5 parts of bottoms, which represented primarily hold-up from the distillation column.

Example 2

A mixture of 100 parts of a crude triallyl isocyanurate prepared as in Example A and 0.1 part of a catalyst comprising 5% of Pd on charcoal was placed in a 250-ml. graduated cylinder and heated to 80 to 95° C. A slow stream of hydrogen was passed through the heated mixture at essentially atmospheric pressure for 45 minutes to permit absorption of hydrogen by the crude triallyl isocyanurate. This treated mixture was then filtered through a Celite bed to give about 82 parts of filtrate; about 18 parts remained in the Celite bed but were recoverable by solvent extraction. The filtrate was distilled at a pressure of 10 mm. of Hg to give about 79.5 parts of substantially pure triallyl isocyanurate. About 2.5 parts of residue remained in the distillation pot.

I claim:

1. A method of preparing purified triallyl isocyanurate which comprises treating crude triallyl isocyanurate containing color and other impurities with hydrogen under conditions to effect absorption of hydrogen by the crude triallyl isocyanurate in an amount less than that required to produce any significant hydrogenation of the triallyl isocyanurate itself so as to substantially eliminate said impurities, and thereafter distilling the hydrogen treated crude triallyl isocyanurate so as to separate substantially pure triallyl isocyanurate distillate therefrom without any substantial loss of triallyl isocyanurate normally resulting from polymerization during said distillation.

2. A method according to claim 1, in which the crude triallyl isocyanurate is treated with hydrogen under conditions to effect absorption by such crude triallyl isocyanurate of no more than about 0.1 mol of hydrogen per mol of triallyl isocyanurate.

3. A method of preparing purified triallyl isocyanurate, which comprises treating crude triallyl isocyanurate containing color and other impurities with hydrogen in the presence of a solid hydrogenation catalyst under conditions to effect absorption b ythe crude triallyl isocyanurate of no more than about 0.1 mol of hydrogen per mol of triallyl isocyanurate so as to substantially eliminate said impurities, and thereafter distilling the hydrogen treated crude triallyl isocyanurate so as to separate substantially pure triallyl isocyanurate distillate therefrom without any substantial loss of triallyl isocyanurate normally resulting from polymerization during said distillation.

4. A method according to claim 3, in which the hydrogenation catalyst is particulate in form and is dispersed in the crude triallyl isocyanurate during the treatment thereof with hydrogen, and which includes separating such particulate hydrogenation catalyst from the treated crude triallyl isocyanurate before the latter is subjected to distillation.

5. A method according to claim 3, in which the hydrogenation catalyst comprises palladium or platinum.

6. A method according to claim 3, in which the crude triallyl isocyanurate is treated with hydrogen in the presence of a solvent for the crude triallyl isocyanurate.

7. A method according to claim 3, in which the crude triallyl isocyanurate is treated with hydrogen at a temperature of up to about 200° C. and at a pressure of up to about 200 atmospheres.

8. A method according to claim 3, in which the treated crude triallyl isocyanurate is subjected to vacuum distillation.

9. A method of preparing triallyl isocyanurate, which comprises reacting allyl chloride, cyanuric acid, and a caustic alkali in an aqueous medium to form crude triallyl isocyanurate containing color and other impurities, treating such crude triallyl isocyanurate with hydrogen in the presence of a solid hydrogenation catalyst under conditions to effect absorption by the crude triallyl isocyanurate of no more than about 0.1 mol of hydrogen per mol of triallyl isocyanurate so as to substantially eliminate said impurities, and thereafter subjecting the treated crude triallyl isocyanurate to vacuum distillation so as to separate substantially pure triallyl isocyanurate distillate therefrom without any substantial loss of triallyl isocyanurate normally resulting from polymerization during said distillation.

References Cited

UNITED STATES PATENTS 2,894,950  7/1959  Lloyd et al. _____ 260—248
3,065,231  11/1962  Frazier et al. _____ 260—248

WALTER A. MODANCE, *Primary Examiner.*

J. M. FORD, *Assistant Examiner.*